United States Patent [19]

Kostousov et al.

[11] 4,091,714
[45] May 30, 1978

[54] BROACHING MACHINE

[76] Inventors: Anatoly Ivanovich Kostousov, Kholzunov pereulok, 10, kv. 16; Valentin Vasilievich Ionov, Korobeinikov pereulok, 5, kv. 7; Vyacheslav Georgievich Shakhbazyan, ulitsa Festivalnaya, 44, kv. 26; Vladimir Afanasievich Terekhin, ulitsa Vishnevskogo, 8, kv. 61, all of Moscow, U.S.S.R.

[21] Appl. No.: 748,374

[22] Filed: Dec. 7, 1976

[51] Int. Cl.² .................. B23D 37/18; B23D 41/06
[52] U.S. Cl. .......................................... 90/76; 90/78; 90/82; 90/88
[58] Field of Search .................. 90/71, 76, 78, 82, 83, 90/84, 88, 80, 89

[56] References Cited
U.S. PATENT DOCUMENTS

| 2,072,563 | 3/1937 | Lynch et al. | 90/76 X |
| 2,751,823 | 6/1956 | Freter | 90/76 |

*Primary Examiner*—Gil Weidenfeld
*Attorney, Agent, or Firm*—Fleit & Jacobson

[57] ABSTRACT

A continuous-action broaching machine for machining the external surfaces of workpieces, wherein the broaches are mounted for continuous motion with respect to a multiposition table carrying a plurality of vices adapted to fix a workpiece being machined therein, the table being mounted for stepwise rotation, to position successively the vices thereof adjacent to a mechanism for loading workpieces into the vices, to the broaches and to a mechanism adapted to transfer and reposition a workpiece from one vice into another one. This repositioning mechanism comprises a rest carrying a head adapted to clamp a workpiece therein, the head being mounted on the rest for rotation about an axis, the repositioning mechanism further including a carriage with guideways for the aforementioned rest, the carriage being mounted on a stationary support for rotation about an axis extending transversely relative to the axis of rotation of the head, whereby a workpiece can be rotated in two different directions, while keeping the position of the reference point on its axis.

6 Claims, 13 Drawing Figures

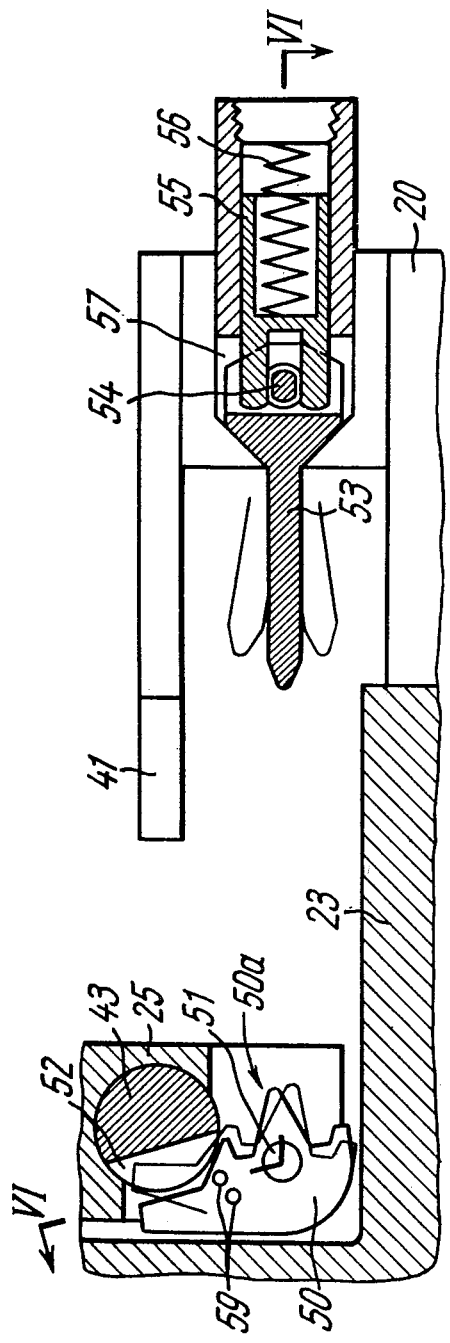
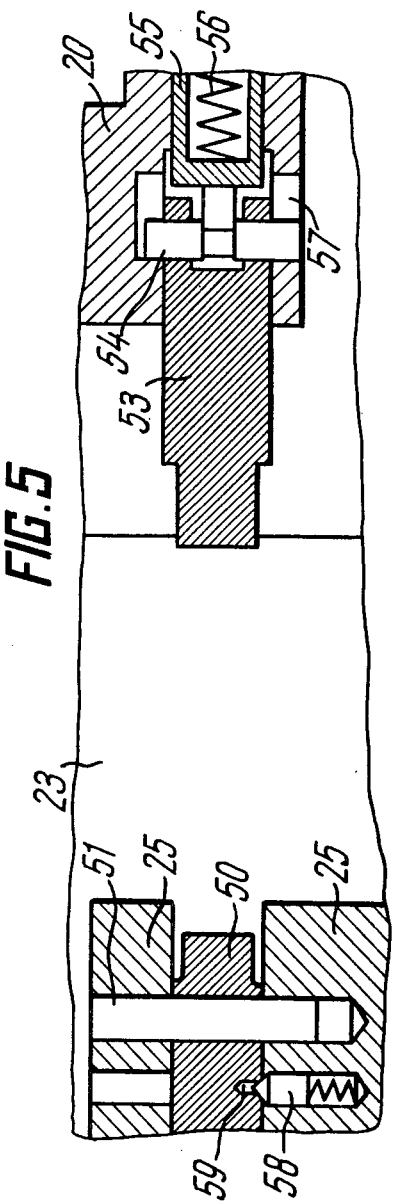
FIG.5
FIG.6

BROACHING MACHINE

The present invention relates to metal-working machines, and, more particularly, it relates to broaching machines of continuous-action.

Broaching machines constructed in accordance with the present invention can be effectively used in series and large-series productions for machining the external surfaces of articles.

It is most expedient to employ a broaching machine in accordance with the invention for performing several successive broaching operations, i.e. in cases where a workpiece is to be re-indexed between two successive operations performed thereupon e.g. when the engagement surfaces and the end faces of compressor and turbine blade footings are machined, or else when the various surfaces of connecting rods and their caps are machined, etc.

There are known continuous-action broaching machines for machining the external surfaces of a workpiece, wherein the broaches are fixed in holders mounted on slides, the latter being carried by an endless conveyor chain.

In this way the broaches are mounted for continuous motion with respect to a multi-position rotatable table, i.e. a table rotatable into a plurality of fixed positions. Some of the aforementioned slides carry no broaches and thus are idle ones.

The rotatable table supports thereon an even number of vices adapted to fix a workpiece therein. At preset intervals depending on the passage time of the idle slides through the cutting zone the rotatable table is rotated through successive angular steps defined by the amount of the vices supported by the table. With four vices on the table, this angular step equals 90°. As the table is thus rotated, the vices thereof are successively brought adjacent to a workpiece loading mechanism, to the broaches which are adapted to machine the external surface of the loaded workpiece, to a workpiece removal mechanism and to a mechanism for transferring and repositioning the workpiece from one vice to another one, when another external surface of the workpiece is to be machined, after one surface thereof has been already machined.

The workpiece loading mechanism is mounted so that when the table is rotated through the corresponding step, one of the vices is positioned in opposition to this workpiece loading mechanism.

To re-position the workpiece from one vice into another one, when another external surface of the workpiece is to be machined after one its surface has already been machined, the aforementioned workpiece transfer and repositioning mechanism is provided, which is likewise arranged so that, following the rotation of the table through the corresponding step, one of its vices is brought in opposition to this workpiece repositioning mechanism, which latter is adapted to rotate the workpiece about its axis through 180°.

The main disadvantage of the above specified known broaching machine consists in that the repositioning mechanism thereof rotates the workpiece being transferred from one vice into another one solely in one direction or one plane, i.e. the workpiece is rotated about its geometric axis without being re-indexed. However, such repositioning is not sufficient for a great number of types of the workpieces, e.g. when such workpieces as compressor and turbine blades are machined, and it is necessary to reposition them after their engagement profiles have been machined and their end faces are still to be machined.

When such workpieces are machined, it is necessary to rotate them in two different planes and also to displace them, as they are being clamped in the vices.

It is an object of the present invention to provide a continuous-action broaching machine for machining the external surfaces of workpiece, including a workpiece repositioning mechanism of a structure providing for rotating the workpiece in different planes, as the workpiece is being repositioned from one vice into another vice.

With this and other objects in view, there is herein disclosed continuous-action broaching machine for machining the external surfaces of a workpiece, wherein the broaches are mounted for continuous motion with respect to a multi-position table supporting thereon a plurality of vices adapted to clamp a workpiece therein, the table being mounted for rotation, to bring the vices successively into opposition to a workpiece loading mechanism, to the broaches and to a mechanism adapted to reposition a workpiece while transferring it from one vice into another one, so that another operation can be performed on this workpiece, in which machine, in accordance with the present invention, the said workpiece repositioning mechanism comprises a rest carrying thereon a head adapted to clamp the workpiece therein, the head being mounted on the rest for rotation about an axis, the workpiece repositioning mechanism further including a carriage with guideways for this rest, mounted on a stationary base for rotation about an axis extending transversely with respect to the axis of rotation of the head, whereby the workpiece can be rotated and indexed in two different planes.

It is expedient that the rest should have made therein guideways extending transversely of the direction of reciprocation of the rest, adapted to receive therein a slide carrying thereon the said rotatable head, the slide being reciprocable in these guideways and adapted to move in one direction under the action of the effort produced by clamping a workpiece in the vice, and further adapted to be retracted into its initial position, as the rest is driven along the guideways of the carriage into its rearmost position, the rest being provided with a spring-urged member adapted to retain the slide in the initial position thereof.

With the rotatable head being mounted on the slide, it becomes possible to displace a workpiece still being gripped by the rotatable head, while the workpiece is being clamped in the vice supported by the rotatable table.

It is not less expedient that the slide should have mounted therein a spring-urged plunger extending parallel with the direction of reciprocation of the slide and operatively connected with the rotatable head for rotating it about the axis, the plunger being mounted to engage a cam, as the rest is being driven toward its rearmost position, the cam being mounted on the carriage, the slide having mounted thereon a catch adapted to retain the plunger therein, so as to retain the head in its turned position and to provide for returning the slide into the initial position thereof.

With rotation of the head and the retraction of the slide into the initial position thereof being affected with aid of the plunger, the catch and the cam, the entire structure of the workpiece repositioning mechanism is significantly simplified.

It is quite rational that the carriage should have mounted thereon, in the area of the accommodation of the rest in the rearmost position thereof, a spring-urged abutment rotatable about an axis parallel with the plunger, and that the catch should have a wedge-shaped projection adapted to cooperate alternatingly by the inclined planes thereof with the said abutment, as the rest is driven into its rearmost position, and thus to rotate the catch into the respective positions corresponding to locking and releasing the plunger in the slide.

The provision of the spring-urged abutment has enabled to attain with relatively simple means the solution of the problem of locking the plunger to retain the head in the turned position of the latter, while the workpiece is being transferred into a vice, and to release the plunger, as the rest is being returned into its initial position.

It is most expedient that the operative connection between the head and the spring-urged plunger should include a pinion mounted on the head and permanently meshing with a toothed segment having its axis of rotation fixed on the slide and extending in a direction parallel with the axis of rotation of the head the segment having made therein a radially extending slot receiving an actuator mounted on the plunger, extending parallel with the axis of rotation of this toothed segment.

This operative connection presents a simple means of converting the reciprocation of the plunger under the action of the cam and the spring into rotation of the head through a preselected angle.

A continuous-action broaching machine for machining the external surfaces of workpiece accomplished in accordance with the present invention, enables to rotate the workpiece, as it is being transferred from one vice into another one, both about the axis of the workpiece and in a plane perpendicular to the last-mentioned axis, which, in its turn, enables to index the workpiece practically in any direction. Furthermore, the provision of the slide supporting the rotatable head makes it possible to displace the workpiece, as it is being clamped in the vice, in a direction transverse of this vice, until the workpiece is released by the rotatable head of the workpiece repositioning machanism, which provides additional facilities for positioning the workpiece, as the latter is being transferred from one vice into another one.

Given hereinbelow is a description of an embodiment of the present invention, with reference being had to the accompanying drawings, wherein:

FIG. 5 is a sectional view taken on line V — V of FIG. 3;

FIG. 6 is a sectional view taken on line VI—VI of FIG. 5;

Figure 1:
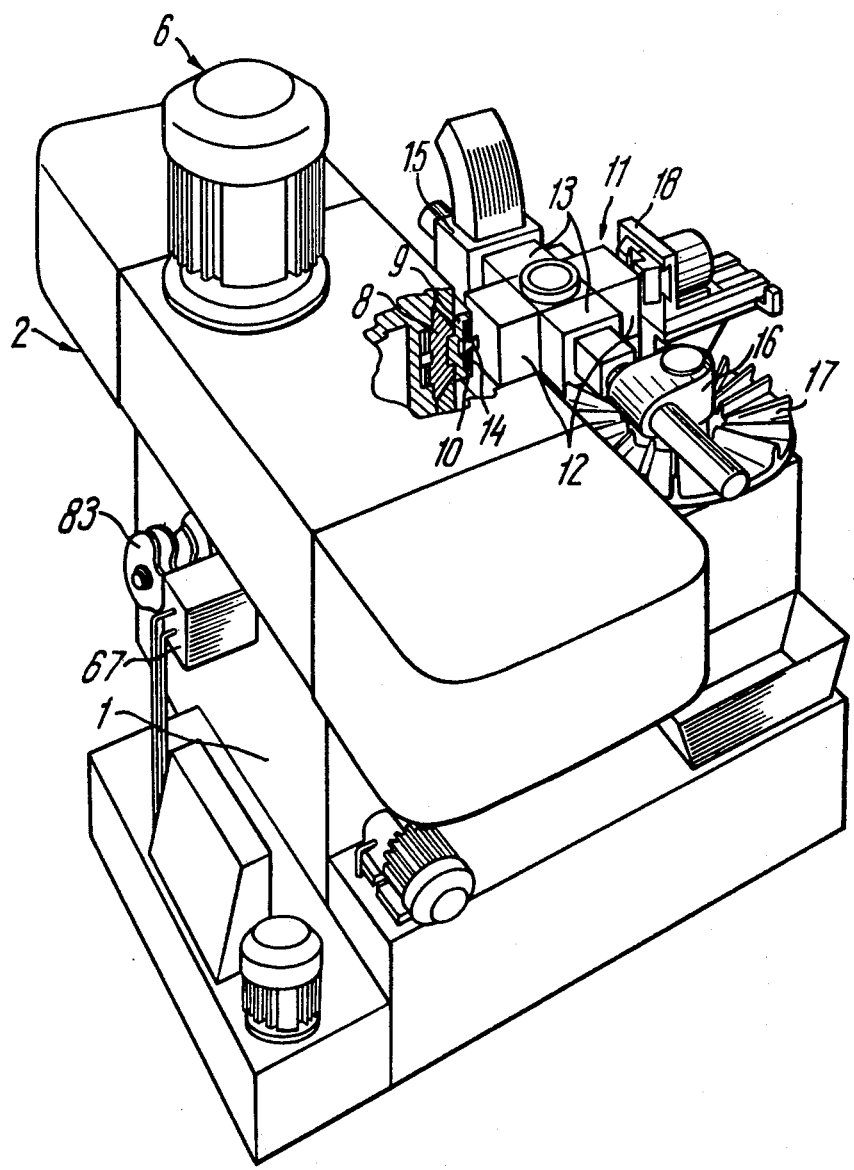
FIG. 1 is a schematic perspective view of a continuousaction broaching machine incorporating a workpiece repositioning mechanism, embodying the present invention.
Figure 2:
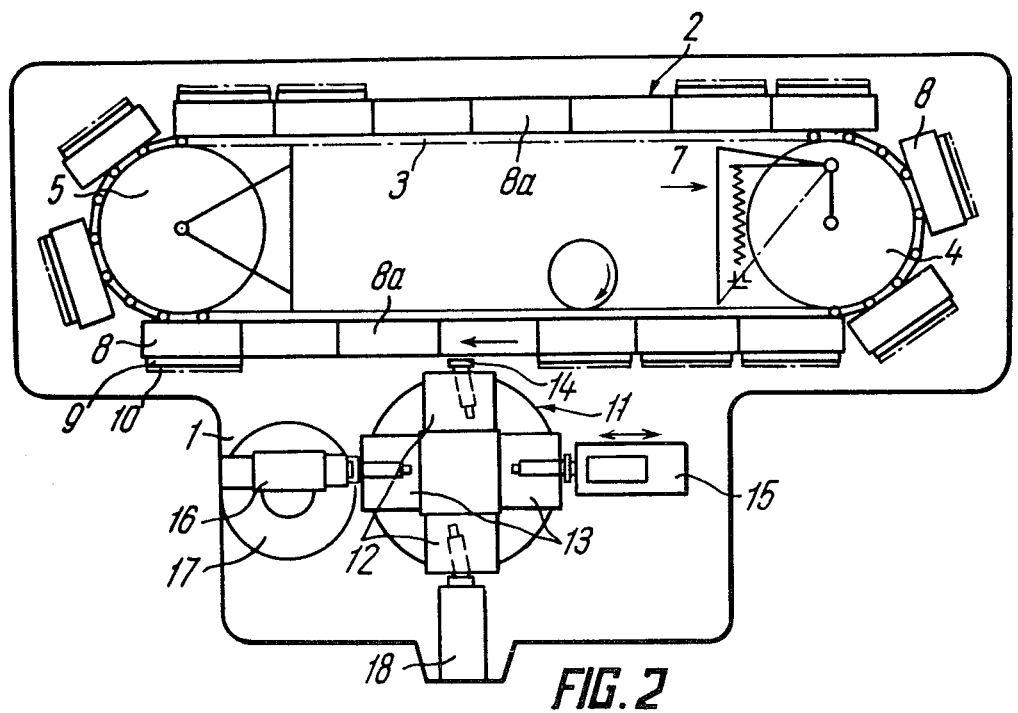
FIG. 2 is an enlarged plan view of the machine shown in FIG. 1.

Referring now in particular to the appended drawings, the broaching machine includes a framework 1 (FIG. 1) supporting thereon a conveyor 2. The conveyor 2 comprises an endless chain 3 (FIG. 2) running about sprockets 4 and 5. The conveyor 2 is provided with a drive 6 (FIG. 1) and a chain-tensioning mechanism 7 (FIG. 2).

The endless chain 3 has mounted thereon a plurality of slide blocks 8 supporting therein holders 9 (FIGS. 1 and 2) in which broaches 10 are fixed.

Mounted on the framework 1 in position to one side or run of the conveyor 2 is a multi-position rotatable work table 11. The work table 11 carry thereon two pairs 12 and 13 of vices adapted to clamp therein a workpiece 14. The first opposing pair 12 of the vices is adapted to clamp and fix the workpiece 14 when one set of the external surfaces of the latter is to be machined; the other pair 13 of vices being adapted to clamp and fix the workpiece 14, so that another set of its external surfaces can be machined.

The vices can be of any known per se structure suitable for the purpose.

Thus, in the presently disclosed embodiment the rotatable work table 11 is a four-position one, i.e. it carries two pairs 12 and 13 of the vices adapted to clamp the successive workpieces 14, while the slide blocks 8 carrying the broaches 10 are divided into two groups or sections, one intended for machining one set of the surfaces of a workpiece 14 and the other one for machining another set of the surfaces of the workpiece. The sections of the broach-carrying slide blocks 8 are separated by slide blocks 8a carrying no broaches, which are hereinafter referred to as the idle slide blocks 8a.

The number of the sections with different types of the broaches depends on the number of the pairs of the vices supported by the rotatable work table. With the latter being a six-position one (i.e. having three pairs of the vices), the conveyor has three sections with different broaches.

Mounted on the framework 1 directly adjacent to the rotatable work table 11 are a mechanism 15 for loading successive workpieces 14 into the vices 12, which can be of any known per se structure suitable for the purpose, and a mechanism 16 for removing the machined workpieces 14, associated with a workpiece accumulator 17, the two mechanisms being angularly spaced by 180° of rotation of the rotatable work table 11. The provision of the workpiece-removing mechanism is necessary when workpieces are to be machined to a high accuracy.

Arranged intermediate of the workpiece-loading mechanism 15 and the workpiece-removing mechanism 16 on the framework 1, and angularly spaced by 90° from either of these two mechanisms is a mechanism 18 for repositioning a workpiece from the vice 12 into the vice 13 after one set of the surfaces of the workpiece has been machined and another set of its surfaces is to be machined.

In embodiments with a six-position work table, two such work-repositioning mechanisms are arranged adjacent to the work table, one for transferring workpieces from the vices of one pair into the vices of the second pair, and one for transferring the workpieces from the vices of this second pair into the vices of the third pair.

The work-repositioning mechanism 18 has a housing 19 (FIG. 3) acting as a stationary support on which there is mounted a carriage 20 rotatable about its vertical axis 21 which latter is a shaft journalled in the housing 19. The carriage 20 has made therein guideways 22 accommodating a rest 23 mounted for reciprocation. The rest 23 has made therein guideways 24 extending transversely of the guideways 22 made in the carriage 20.

The guideways 24 accommodate therein a slide 25 having a rear part 26 rigidly secured to a front part 27. The front part 27 has a portion made in the form of a hollow cylinder. In this hollow cylinder of the front part 27 of the slide 25 there is mounted a head 28 adapted to clamp a workpiece 14.

The head 28 is mounted in the slide 25 for rotation about its geometrical axis "a" which is substantially perpendicular to the axis 21 of rotation of the carriage 20.

The head 28 has a hollow cylindrical tailpiece 29 of which the front portion, i.e. the portion facing the vices on the work table 11, is provided with guideways 30 in which there are mounted jaws 31 adapted to grip a workpiece 14 therebetween. The jaws 31 are mounted for reciprocation in opposite directions under the action of a rod 32 received within the tailpiece 29 and urged into its frontmost position, corresponding to the closed position of the jaws 31, by a spring 33. The front end of the rod 32 has inclined grooves 34, while the jaws 31 are provided with lugs (not shown) receivable in these grooves. The opposite end of the rod 32 is connected operatively via a rocker arm 35 to a drive (not shown) adapted to move the rod 32 axially against the effort of the spring 33 in a direction corresponding to the jaws 31 being opened, i.e. spread apart in opposite directions.

The rest 23 has mounted therein a means 36 adapted to retain the slide 25 in the initial position of the latter. The retaining means 36 is made up by a sleeve 37 receiving a spring-urged stud 38 projectable into a notch 39 cut in the slide 25.

Figure 3:
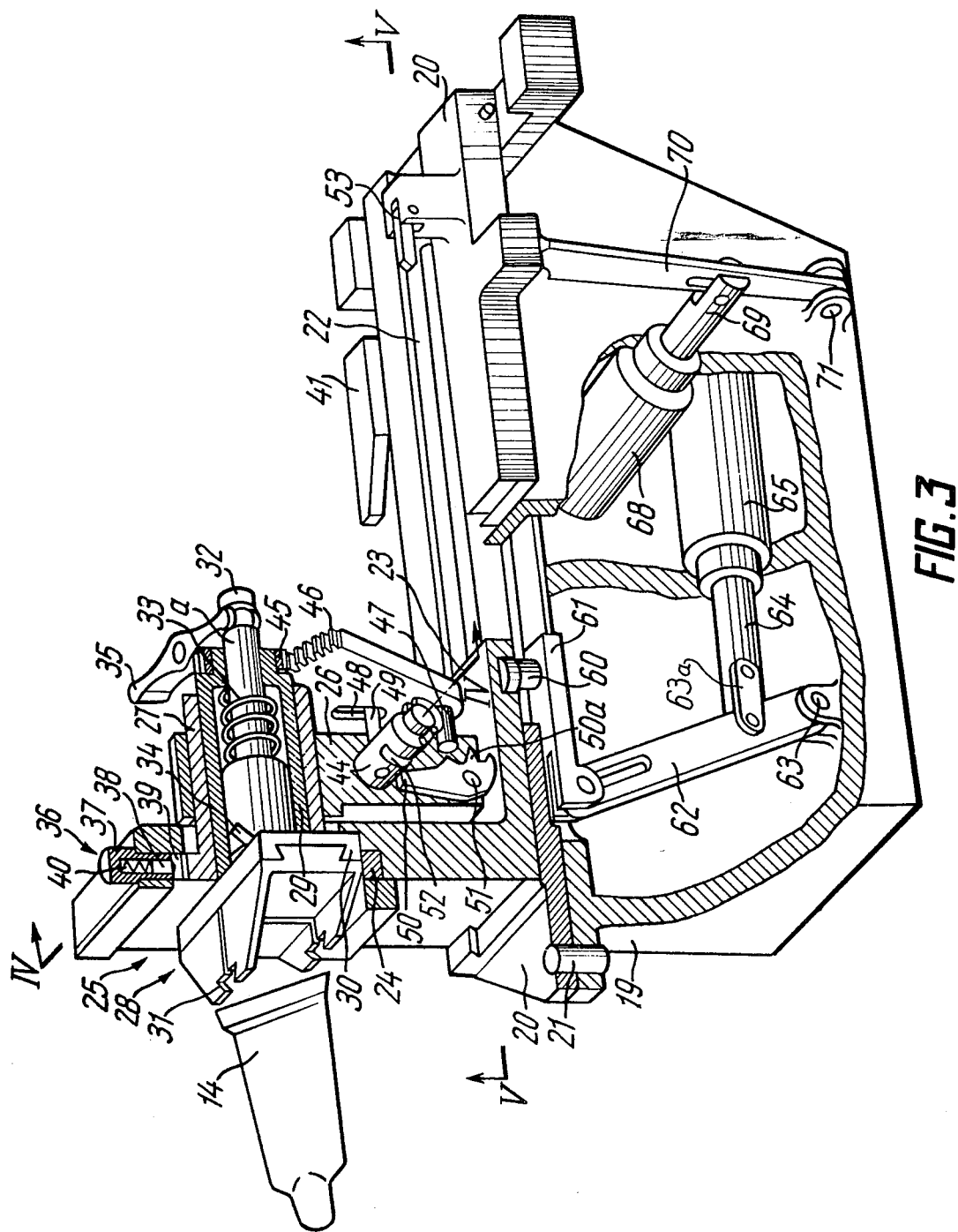
FIG. 3 is a perspective partly broken-away view of the workpiece repositioning mechanism, constructed in accordance with the invention.
Figure 4:
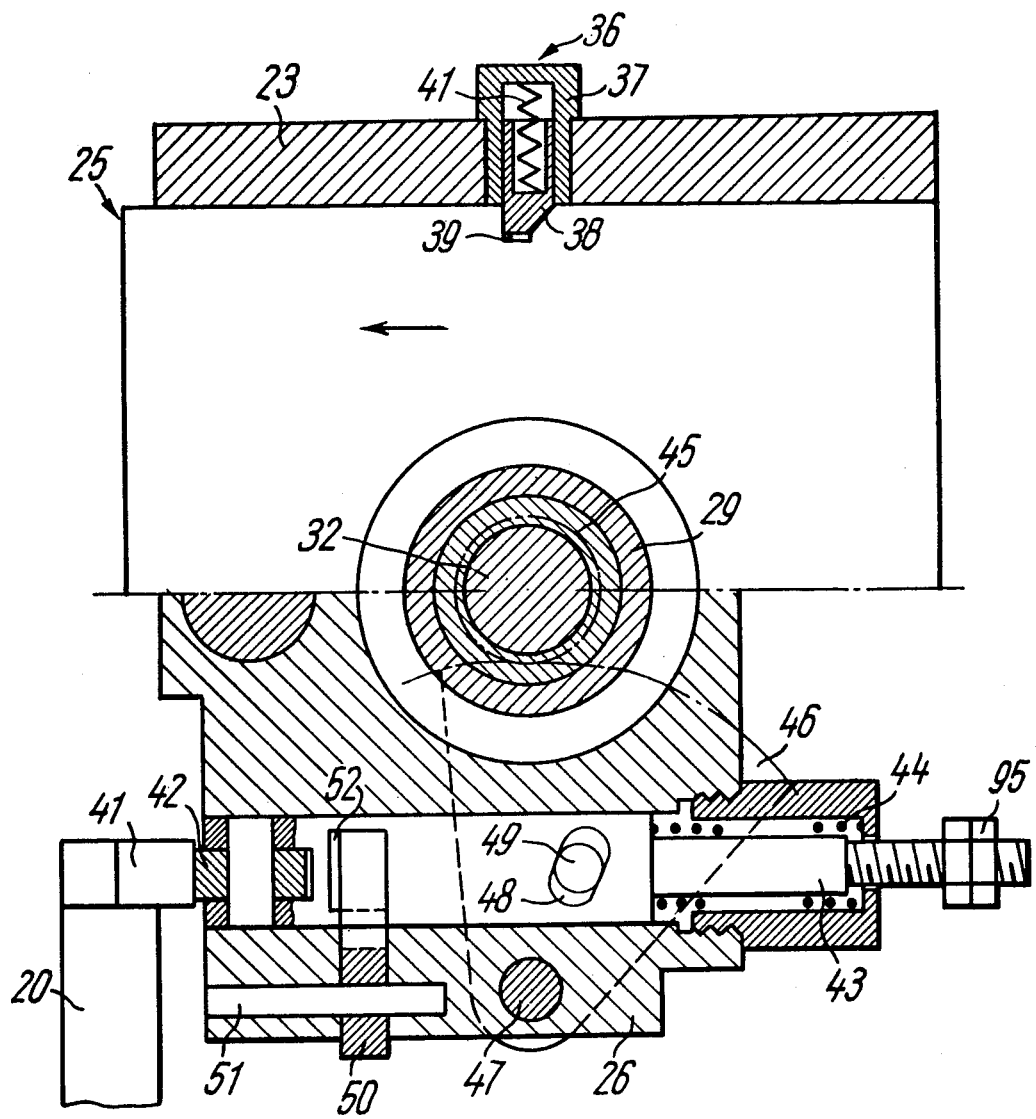
FIG. 4 is a sectional view taken on line IV—IV of FIG. 3.

The motion of the slide 25 in one direction is effected by an effort produced when the workpiece 14 is being clamped in the vice 13, this effort overcoming the effort of the spring 40 of the retaining means 36, so that the slide 25 is advanced along the guideways 24. To retract the slide 25 into its initial position, there is provided a cam surface 41 secured on the carriage 20 in the area corresponding to the rearmost position of the rest 23, the cam surface being adapted to be engaged by a follower 42 (FIG. 4). The follower 42 is mounted on a plunger 43 mounted in the rear portion 26 of the slide 25 and extending parallel with the direction of the latter's reciprocation. The plunger 43 is axially biased by a spring 44 and is operatively connected with the head 28 for rotating the latter about its geometrical axis "a" (FIG. 3). The operative connection of the head 28 with the plunger 43 includes a pinion 45 mounted on the tailpiece 29 of the head 28 and a toothed segment 46 permanently meshing with the pinion 45. The pin 47 on which the rotatable segment 46 is mounted, is journalled in the slide 25 and extends parallel with the geometrix axis "a" of the head 28.

A radial groove 48 is cut in the toothed segment 46, while the plunger 43 carries an actuator 49 extending parallel with the pin 47 of the toothed segment 46 and receivable in the groove 48.

To retain the head 28 in its turned position and to provide a fixed connection between the plunger 43 and the slide 25, as the latter is retracted into its initial position, there is provided a catch 50 mounted on a pivot pin 51 (FIGS. 4, 5 and 6) journalled in the slide 25. The catch 50 is pivotable to engage the plunger 43 by entering a notch 52 cut in this plunger 43.

To pivot the catch 50 into and out of the engagement with the plunger 43, there is provided a spring-urged abutment 53 (FIGS. 5 and 6) mounted on a pin 54 carried by the carriage 20. This pin 54 extends parallel with the plunger 43 and with the pivot axis 51 of the catch 50.

The abutment 53 is spring-urged in the axial direction, because the pin 54 is connected with a member 55 receiving therein a compression spring 56 urging the abutment 53 into the latter's frontmost position, a slot 57 being provided in the carriage 20 to guide the motion of the pin 54.

To cooperate with the abutment 53, the catch 50 is provided with a wedge-shaped projection 50a, the inclined surface (i.e. the upper and lower ones in the drawing) of which are arranged to alternatingly engage the abutment 53, so that the catch 50 is pivoted correspondingly.

The slide 25 has mounted therein a spring-urged stud 58, while the catch 50 has made therein two notches 59 adapted to receive this stud 58, the two notches 59 being somewhat spaced from each other. In this manner the cath 50 is retainable in the open or plunger-releasing position thereof and in the plunger-engaging position.

To effect reciprocation of the rest 23 along the guideways 22, the former is connected via linkage 60 (FIG. 3) and 61 to a slotted crank 62 pivotable about a pin 63 mounted in the housing 19. The slotted crank 62 is connected via a link 63a to the plunger rod 64 of a hydraulic cylinder 65 controlled by a slide valve 66 (FIG. 7) in a valve box 67.

Figure 7:
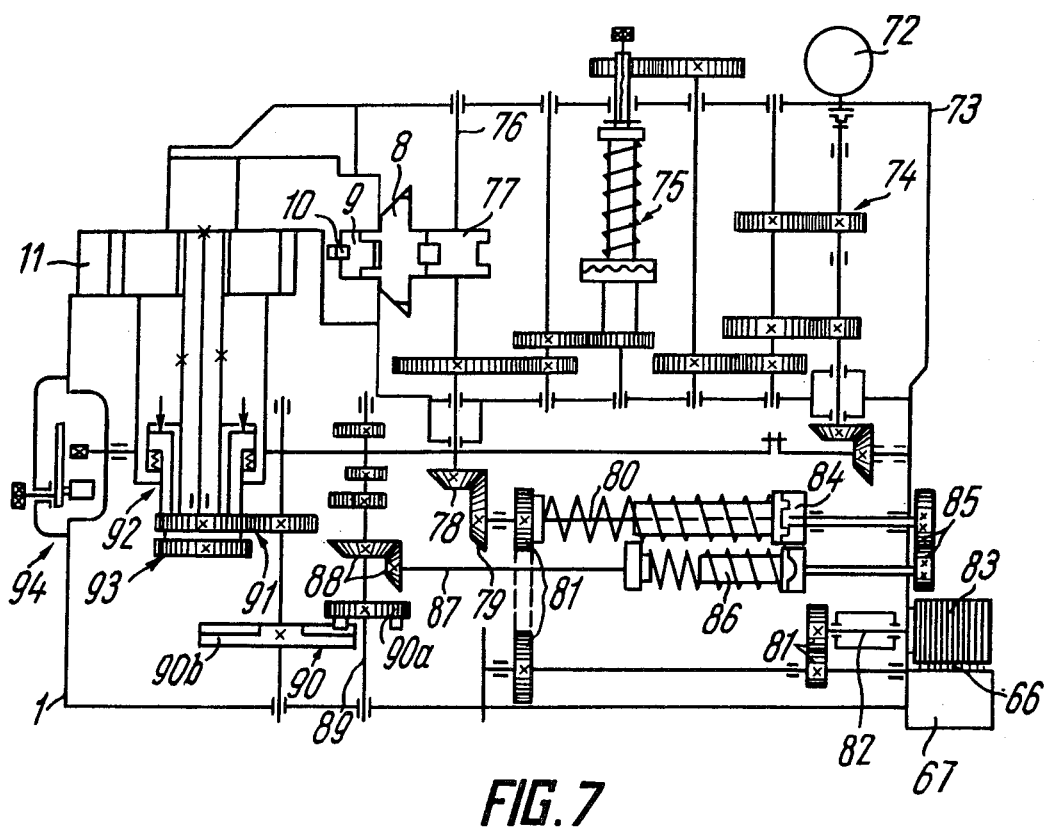
FIG. 7 is the drive diagram of the broaching machine.

The carriage 20 is rotatable about the shaft 21 by a hydraulic cylinder 68 (FIG. 3) controlled by its respectable slide valve 66 (FIG. 7). The plunger rod 69 (FIG. 3) of the hydraulic cylinder 68 is pivotably connected with an arm 70 pivotable about a pivot pin 71 mounted in the housing 19.

The end of this arm 70 is drivingly connected with the carriage 20 to rotate the latter.

The drive system 6 (FIG. 1) of the conveyor 2 includes a main motor 72 drivingly connected via a gear reducer 74 with a torque-limiting dog coupling 75, arranged within the housing 73 of the conveyor 2, to a shaft 76 carrying thereon a gear 77 arranged to mesh successively with the respective toothed rack of each slide block 8 passing by the gear 77, in which way there is effected the continuous motion of the slide blocks 8 along an oval-rectilinear path. One end of the shaft 76 has secured thereon a bevel gear 78 meshing with another bevel gear 79 secured on a horizontal shaft 80 journalled in the frame work 1. From this shaft on, the transmitted torque is divided into two paths. Along the first path the driving torque is transmitted via gears 81 to the distributor shaft 82 with cams 83 actuating the slide valves 66 of the valve box 67. The gearing is such that the distributor shaft 82 is rotated through one revolution per one full cycle of the motion of the slide blocks 8 along the closed path of the conveyor 2.

The other part of the driving torque is transmitted via the second path through a dog coupling 84, a couple of change gears 85 and a torque-limiting coupling 86 to a shaft 87. The shaft 87 is connected through a bevel gear couple 88 to a camshaft 89, the latter being adapted to rotate the work table 11 through angular portions corresponding to the spacing between successive positions, i.e. through 90° in the presently described embodiment, via a Geneva cross 90 and gearing 91. The work table 11 is rotated, while the idle slide blocks 8a pass through the machining zone. Owing to this rotation of the table 11 the vices 12 and 13 are alternatingly brought to the workpiece loading mechanism 15, to the broaches 10 brought into the machining zone, to the mechanism 16 for removing the workpieces 14 following their having been machined, and to the workpiece repositioning mechanism 18.

After having been rotated through a successive angular portion, the work table 11 is retained and urged against the framework 1 by a power cylinder 92, the table being braked at the end of its rotation by a braking device 93. The said operations of retaining the table 11, braking it and urging it against the framework 1 are controlled by the cams of the camshaft 89. The mechanisms 15 and 16 are actuated by their respective hydraulic cylinders (not shown) controlled by the respective cams 83 of the distributor shaft 82 through their respective slide valves 66 in the valve box 67.

One of the cams 83 of the distributor shaft 82 controls via a linkage (not shown) the engagement of the dog coupling 84, when the idle slide blocks 8a pass through the machining zone, to transmit the driving torque to the camshaft 89.

The framework also has mounted therein a manual drive 94 which is used for the adjustement purposes.

The herein disclosed continuous-action broaching machine operates, as follows.

When the main motor 72 is energized, the driving torque is transmitted from the motor through the gear reducer 74 to the shaft 76.

The gear 77 mounted on the shaft 76 meshes successively with the slide blocks 8, each slide block 8 having on the side thereof, remote from the broach holder, a toothed rack meshing with the teeth of the gear 77, so that the endless chain 3 is driven through a continuous motion.

From the shaft 76 through the bevel gears 78 and 79 the torque is transmitted to the horizontal shaft 80.

From this shaft the torque is divided along two paths: along the 1-st path the motion is transmitted through the pinions 81, whereby the distributor shaft is rotated and makes one full revolution per full cycle of the motion of a slide block 8 along the closed path of the conveyor 2; along the second path the motion is transmitted through the periodically engaged dog coupling 84, the gear couple 85, the torque-limiting coupling 86 and gears 88 to the camshaft 89.

As the roller of the driver arm 90a of the Geneva cross assembly 90 enters the successive slot of the cross 90b, the rotatable work table 11 is rotated through the angular spacing between the successive positions, i.e. through 90° in the presently described embodiment with the four-position work table 11.

As the work table 11 is thus rotated, while the respective idle blocks 8a are carried through the machining zone, the vices 12 and 13 mounted on the table 11 and gripping the workpieces 14 therein are carried from the loading station into the machining station, from the machining section into the removing station, from the removing station into the repositioning station and from the re-positioning station into the loading station, which completes the cycle.

The mechanisms 15 and 16 are actuated by their respective hydraulic cylinders (not shown) controlled by their control slide valves 66 of the valve box 67, actuated by the respective cams 83 of the distributor shaft 82.

After the work table 11 has been rotated through successive 90°, one of the vices 12 is positioned next to the loading mechanism 15, and a workpiece 14 to be machined is fed into the vice 12 and is clamped therein. After the successive rotation of the work table 11 through 90° this vice 12 with the workpiece 14 is positioned at the machining station, where the external surfaces of the workpiece 14 are broached, which corresponds to the first broaching operation. With the first broaching operation completed, the successive series of the idle side blocks 8a passes through the machining zone, and meanwhile the work table 11 is rotated through successive 90° into its next position, whereby the vice 12 with the workpiece 14 are carried over into the workpiece removal station; the successive rotating step of the table 11 brings this vice 12 with this workpiece 14 into the zone of the repositioning mechanism 18. The rest 23 of this mechanism 18, with the rotatable head 28 thereon, approaches the projecting portion of the workpiece 14, grips it in the jaws 31, whereafter the vice 12 releases the workpiece 14, and the rest 23 with the workpiece 14 now held by the jaws 31 is retracted into its rearmost position, i.e. into the position most remote from the vice 12.

As the rest 23 is being thus retracted along the guideways 22, the follower 42 of the plunger 43 engages the profiled field of the cam 41, whereby the plunger 43 is axially displaced accordingly, the actuator 49 received in the groove 48 of the toothed segment 46 rotating the latter. As the tooth segment permanently meshes with the pinion 45, the head 28 is rotated through the predetermined angle.

The accuracy and extent of the rotation of the head 28 in one direction are preset by the location and shape of the cam 41, and in the opposite direction — by the location of stop nuts 95 on the end portion of the plunger 43.

As the plunger continues its motion, the wedge-shaped projection 50a of the catch 50 engages the pivotable abutment 53, the latter sliding along the lower inclined surface of the wedge-shaped projection 50a and pivoting the catch 50. The catch 50 enters the notch 52 and thus locks the plunger 43 in the latter's "cocked" position.

In the meantime the corresponding cam 83 on the distributor shaft 82 actuates the respective control valve 66 in the valve box 67 to control the hydraulic cylinder 68, so as to rotate the carriage 20 about the axis 21 into a position corresponding to the required position of the workpiece 14 in the vice 13 for the second machining operation. The angle of this rotation of the carriage 20 is preset with aid of corresponding rigid replaceable abutments (not shown in the drawings).

As the vice 13 for the second machining operation enters the machining zone of the repositioning mechanism 18, the corresponding cam 83 on the distributor shaft 82 actuates the respective one of the control valves 66 to supply the working liquid under pressure to the hydraulic cylinder 65. Consequently, the rest 23 with the workpiece 14 held therein is driven by the arm 62 toward the vice 13, so that the workpiece 14 enters the vice 13. As the rest 23 is thus moved toward the vice 13, the follower 42 of the plunger 43 clears the cam 41, but the plunger 43 held by the catch 50 remains in its cocked position, and, consequently, the head 28 with the workpiece 14 gripped therein also remains in its turned position. In the course of the operation of clamping the workpiece 14 in the vice 13 for the second machining operation, the workpiece 14 is somewhat displaced together with the slide 25, which latter is held in its initial position by the spring-urged retaining member 36. Upon the workpiece 14 having been clamped in the vice 13, the rod 32 is retracted by the rocker arm 35 into its endmost (at the extreme right in the drawing) position, corresponding to the fully open position of the jaws 31. Then the rest 23, too, is retracted into its initial position (at the extreme right in the drawing).

While the rest 23 is being thus retracted, the follower 42 of the plunger 43 engages the cam 41 and returns the slide 25 into the latter's initial position where it is retained by the retaining member 36. With the plunger 43 driven into its rearmost position, the catch 50 is acted upon by the pivotable abutment 53 now engaging the upper inclined plane of the projection 50a, whereby the catch 50 is displaced to release the plunger 43; simultaneously, the carriage 20 is rotated into its initial position. When the vice 12 for the first machining operation are brought into the repositioning station, the rest 23 is driven forward, and the now released plunger 43 is moved by its spring 44, so that the plunger clears the cam 41 and thus rotates the head 28 into the latter's initial position.

With the vice for the second machining operation brought into the machining zone, the workpiece 14 held in the vice is engaged by the second section or series of the broaches 8, and the other set of the external surface of this workpiece 14 is machined. When this machining session is over, and the successive series of the idle slide blocks 8a passes through the machining zone, the table 11 is rotated once again to carry the now machined workpiece 14 into the removing station where the mechanism 16 effects releasing of the workpiece 14 and places the latter into the accumulator 17.

Thus, the full cycle of machining the workpiece 14 of the kind shown in FIGS. 8 to 13 takes two full revolutions of the work table 11; however, at the same time other workpieces in the rest of the vices are similarly processed, whereby the productivity of the machine of the presently described embodiment per one workpiece can be calculated from two successive rotation steps of the work table through 90°, which corresponds to the full cycle of the motion of the slide blocks 8 along the closed path of the conveyor. The workpieces are loaded by the mechanism 15 into the vices 12 for the first machining operation and removed from the vices 13 by the mechanism 16, following the second machining operation.

Figure 8:
FIG. 8 shows a blank of a compressor blade.
Figure 10:
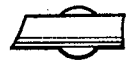
FIG. 10 shows the side view of the same blank.
Figure 9:
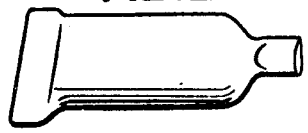
FIG. 9 shows the same blank viewed in plan.
Figure 11:
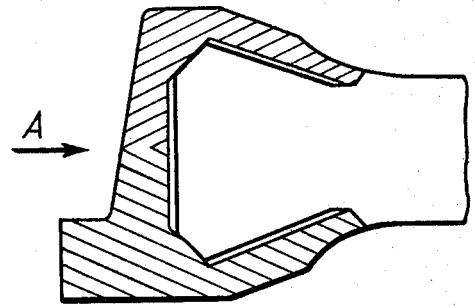
FIG. 11 illustrates the pattern of machining the contour of the footing of a compressor blade.
Figure 12:
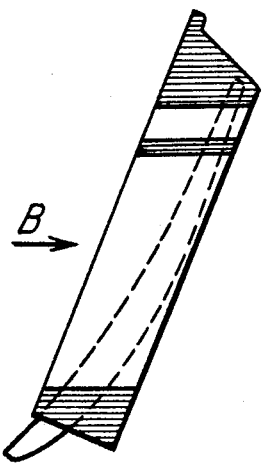
FIG. 12 illustrates the pattern of machining the end faces of the footing and the groove of a compressor blade, as viewed along arrow A in FIG. 11.
Figure 13:
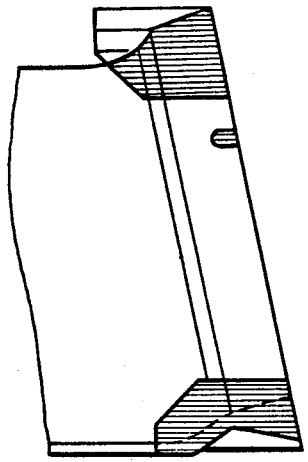
FIG. 13 shows the same, as viewed along arrow B in FIG. 12.

As an example of a workpiece that can be machined, there is shown in FIGS. 8, 9 and 10 a semi-finished compressor blade. FIG. 11 shows schematically the allowance (the shaded portion) for machining the engagement contour of the footing of the blade removed during the first machining or broaching operation. Prior to the second machining operation, the mechanism 18 repositions the blade by rotating it in two different planes and by additionally displacing it, while the blade being clamped by the vice for the second broaching operation. The machining pattern of the second broaching operation is illustrated in FIGS. 12 and 13 wherein the removed allowances are shown as shaded portions.

A continuous-action broaching machine accomplished in accordance with the present invention replaces a full production line of several broaching machines among which each machine is capable of machining only those surfaces of workpieces which correspond to a single position of these workpieces.

What is claimed is:

1. A continuous-action broaching machine for machining the external surfaces of workpieces, comprising: a framework; a multi-position rotatable work table supported by said framework; a plurality of vices adapted to clamp workpieces therein, mounted on said work table defining the multi-positions thereof; a transport means mounted adjacent to said multi-position work table; a plurality of broaching tools mounted on said transport means to be continuously carried past said multi-position work table; a workpiece loading means mounted on said framework adjacent to said multi-position work table for loading workpieces into said vices; a workpiece repositioning means for receiving a workpiece from one of said plurality of vices and for inserting the received workpiece into another of said plurality of vices, two successive machining operations performed on this workpiece; said workpiece repositioning means including a stationary support, a carriage mounted on said stationary support for rotation with respect thereto, first guideway means defined by said carriage, a rest mounted on said carriage for movement in said first guideway means, a head adapted to clamp a workpiece therein, mounted on said rest for rotation about an axis transverse to the axis of rotation of said carriage, whereby a workpiece clamped in said head can be rotated in two different planes, means for rotating said carriage, rotating said head, moving said transport means and said broaching tools mounted thereon, and for effecting stepwise rotation of said multi-position work table, so as to present each of said vices successively to said workpiece loading means, said broaching tools and said workpiece repositioning means.

2. A broaching machine of claim 1, wherein second guideway means are defined in said rest extending transversely of the direction of reciprocation of the rest, a slide is mounted for reciprocal movement on said rest in said second guideway means, said slide carrying thereon said rotatable head, the slide being reciprocable in the second guideway means and adapted to move from its initial position under the action of the effort produced at clamping of a workpiece in one of said vices and to return to its initial position as said rest is being driven along said first guideway means into its rearmost position, and a spring-urged member is provided on said rest for retaining the slide in its initial position.

3. A broaching machine of claim 2, wherein a spring-urged plunger is mounted in the slide extending parallel with the direction of reciprocation of the slide and operatively connected with said rotatable head for rotating the latter about its axis, a cam engageable by said plunger as said rest is being driven toward its rearmost position being mounted on said carriage and a catch and being mounted on said slide for locking or releasing the plunger in a position to retain said head in the turned position of the latter during the movement of the slide into the initial position thereof.

4. A broaching machine of claim 3, wherein a spring-urged abutment is mounted on said carriage in the area of the accommodation of said rest in the latter's rearmost position, the spring-urged abutment being pivotable about an axis parallel with the axis of the plunger, the catch having a wedge-shaped projection adapted to cooperate by the inclined planes thereof in alternation with the said abutment, as said rest is being driven toward the rearmost position thereof, and thus to pivot said catch into the respective positions corresponding to locking or releasing the plunger.

5. A broaching machine of claim 3, wherein the operative connection of said head with the spring-urged plunger includes a pinion mounted on said head, a toothed segment permanently meshing with the pinion and mounted on the slide with an axis of rotation extending in a direction parallel with the axis of rotation of said head, the segment having made therein a radial slot, and an actuator receivable in the radial slot and mounted on the plunger, the actuator extending parallel with the axis of rotation of the toothed segment.

6. A broaching machine of claim 1 wherein said plurality of broaching tools is comprised of a plurality of sets of broaching tools, at least one of said plurality of sets containing a different broaching tool than the other sets, each of said plurality of sets of broaching tools being separated from adjacent sets of broaching tools by a region of said transport means free from broaching tools.

* * * * *